United States Patent
Scholl et al.

(10) Patent No.: US 8,226,396 B2
(45) Date of Patent: Jul. 24, 2012

(54) DEVICE FOR THE PRODUCTION OF GRANULATE GRAINS FROM A PLASTIC MELT

(75) Inventors: Hans J. Scholl, Aschaffenburg (DE); Joachim Sommer, Seligenstadt (DE)

(73) Assignee: Automatik Plastics Machinery GmbH (DE)

( * ) Notice: Subject to any disclaimer, the term of this patent is extended or adjusted under 35 U.S.C. 154(b) by 344 days.

(21) Appl. No.: 12/530,611

(22) PCT Filed: Mar. 5, 2008

(86) PCT No.: PCT/EP2008/001744
§ 371 (c)(1),
(2), (4) Date: Mar. 2, 2010

(87) PCT Pub. No.: WO2008/107173
PCT Pub. Date: Sep. 12, 2008

(65) Prior Publication Data
US 2010/0143524 A1    Jun. 10, 2010

(30) Foreign Application Priority Data
Mar. 8, 2007   (DE) .................. 20 2007 003 495 U

(51) Int. Cl.
*B29B 9/06* (2006.01)
*B29C 47/30* (2006.01)
(52) U.S. Cl. ........ 425/313; 425/307; 425/311; 425/464; 425/381.2; 425/382 R; 264/140; 264/142
(58) Field of Classification Search .............. 425/67, 425/306, 307, 310, 311, 313, 382 R, 382.2, 425/382.3, 464, 465, 466; 264/140, 142
See application file for complete search history.

(56) References Cited

U.S. PATENT DOCUMENTS

| 3,599,285 | A | | 8/1971 | Hamilton | |
| 3,599,286 | A | * | 8/1971 | Karet | ............................. 425/464 |

(Continued)

FOREIGN PATENT DOCUMENTS
DE        10344793 A1    4/2005
(Continued)

OTHER PUBLICATIONS

International Preliminary Report on Patentability in related application PCT/EP2008/001744 mailed Oct. 15, 2009.

(Continued)

*Primary Examiner* — Joseph Del Sole
*Assistant Examiner* — Seyed Masoud Malekzadeh
(74) *Attorney, Agent, or Firm* — Pillsbury Winthrop Shaw Pittman LLP

(57) ABSTRACT

The invention relates to a device for the production of granulate grains from a plastic melt, having a nozzle plate with at least one nozzle opening from which a strand of the plastic melt is discharged into a processing chamber, and a cutting tool having at least one cutting blade that may be moved against the nozzle plate by means of a feed device, wherein the plastic strand discharged from the nozzle opening of the nozzle plate can be fragmented into granulate grains by the cutting blade moving relative to the nozzle opening. The nozzle plate has a diamond coating at least on the surface thereof facing the cutting tool, with the hardness of the diamond coating being greater than the hardness of the cutting blade, and with the average roughness of the diamond coating being greater than the average roughness of the cutting blade by at least a factor of two.

6 Claims, 2 Drawing Sheets

U.S. PATENT DOCUMENTS

| | | | |
|---|---|---|---|
| 3,749,539 A * | 7/1973 | Galbreath et al. | 425/313 |
| 3,847,530 A * | 11/1974 | Hamilton | 425/461 |
| 4,167,386 A | 9/1979 | Mallay | |
| 4,264,553 A * | 4/1981 | Loo | 264/142 |
| 4,378,964 A * | 4/1983 | Wolfe, Jr. | 425/463 |
| 4,516,925 A * | 5/1985 | Fujita et al. | 425/463 |
| 4,564,350 A * | 1/1986 | Holmes et al. | 425/313 |
| 4,621,996 A * | 11/1986 | Hundley, III | 425/190 |
| 4,653,996 A * | 3/1987 | Ozaki et al. | 425/461 |
| 4,678,423 A * | 7/1987 | Bertolotti | 425/311 |
| 4,720,251 A | 1/1988 | Mallay et al. | |
| 4,752,196 A * | 6/1988 | Wolfe, Jr. | 425/67 |
| 4,820,146 A * | 4/1989 | Inoue et al. | 425/461 |
| 4,856,974 A * | 8/1989 | Wolfe, Jr. | 425/67 |
| 5,403,176 A | 4/1995 | Bruckmann et al. | |
| 5,711,492 A * | 1/1998 | Cheladze | 241/220 |
| 5,714,173 A * | 2/1998 | Matsuo | 425/67 |
| 6,976,834 B2 * | 12/2005 | Knight et al. | 425/311 |

FOREIGN PATENT DOCUMENTS

| | | |
|---|---|---|
| DE | 202005001809 U1 | 5/2005 |
| DE | 102004049862 A1 | 4/2006 |

OTHER PUBLICATIONS

International Preliminary Report on Patentability in related application PCT/EP2008/001744 mailed Sep. 17, 2009.

International Preliminary Report on Patentability in related application PCT/EP2008/001744 mailed Jul. 14, 2008.

* cited by examiner

DEVICE FOR THE PRODUCTION OF GRANULATE GRAINS FROM A PLASTIC MELT

CROSS REFERENCE TO RELATED APPLICATIONS

This application is a U.S. National phase of International Application No. PCT/EP2008/001744, filed Mar. 5, 2008, which claims priority to German Patent Application No. 20 2007 003 495.4, filed Mar. 8, 2007. The contents of both applications are incorporated herein by reference in their entireties.

The invention relates to a device for the production of granulate grains from a plastic melt, which includes a nozzle plate having at least one nozzle opening from which a strand of the plastic melt is discharged into a processing chamber, and which includes a cutting tool having at least one cutting blade that may be moved against the nozzle plate by means of a feed device, it being possible to fragment the plastic strand discharged from the nozzle opening of the nozzle plate into granulate grains by the cutting blade moving relative to the nozzle opening.

In devices of this type, the problem generally exists that the cutting blade and nozzle plate are subject to substantial wear during the course of operation, whereby the fragmentation of the plastic strands into granulated grains is no longer satisfactory or is even no longer possible at all. In particular, the nozzle plate is also relatively complex and expensive to manufacture, which means that the service life of the nozzle plate should be as long as possible. Conventional nozzle plates, such as those having hard metal are able to achieve service lives of only approximately 10,000 hours, while corresponding cutting blades used therewith, which do not have a hard metal coating, achieve service lives of only 500 to 1,000 hours.

German utility model DE 20 2005 001 809 U1 describes a perforated plate for an underwater granulator which may have an anti-wear and thermal insulation layer, which is not described in greater detail, on its end face.

The U.S. Pat. No. 5,403,176 describes a nozzle plate system which may have a wear surface in the form of a wear ring or the like.

The object of the present invention is therefore to provide a device for the production of granulate grains from a plastic melt which overcomes the disadvantages of the prior art and, in particular, is relatively cost-effective, has a long component life and enables granulate grains to be reliably formed even after prolonged operation or toward the end of the component life.

This object is achieved according to the invention by a device for the production of granulate grains which has the features according to Claim 1. Preferred embodiments are defined in the subordinate claims.

The device according to the invention for the production of granulate grains from a plastic melt includes a nozzle plate that has at least one nozzle opening from which a strand of the plastic melt is discharged into a processing chamber, and includes a cutting tool that has at least one cutting blade which may be moved against the nozzle plate by means of a feed device, it being possible to fragment the plastic strand discharged from the nozzle opening of the nozzle plate into granulate grains by the cutting blade moving relative to the nozzle opening. According to the invention, the nozzle plate has a diamond coating at least on the surface thereof facing the cutting tool. the hardness of the diamond coating, i.e. the hardness of the diamond coating material, being greater than hardness of the cutting blade, i.e. the cutting blade material, and the average roughness of the diamond coating, i.e. the diamond coating material, being greater than the average roughness of the cutting blade, i.e. the average roughness of the cutting blade, i.e. the cutting blade material, by at least a factor of two.

Due to the design of the device according to the invention, which includes the nozzle plate having a diamond coating whose hardness is greater than the hardness of the cutting blade, the service life of a nozzle plate of this type may be greatly extended over that of conventional nozzle plates having normal hard metal coatings. The less hard cutting blades according to the invention are "wearing parts" and therefore less expensive and also possibly easier to replace. In addition, the granulation performance of the device according to the invention is even further improved by the fact that, due to the average roughness of the diamond coating, i.e. the material of the diamond coating, which is greater that the average roughness of the cutting blade, i.e. the material of the cutting blade, by at least a factor of two, a certain resharpening effect for the cutting blade is achieved according to the invention, which ensures that granulate grains may continue to be reliably formed even after prolonged operation or toward the end of the service life. Due to the design according to the invention, the overall hardness level of the components used may be increased, making it possible according to the invention to substantially improve the service lives of these components.

The average roughness of the diamond coating may preferably be greater than the average roughness of the cutting blade by as much as a factor of at least five, preferably by a factor of ten, which makes it possible to further improve the resharpening effect.

The average roughness of the diamond coating may be greater than or equal to 0.50 μm.

The diamond coating may have a thickness in the range of 50 μm to 100 μm.

The diamond coating may be situated on or applied to a removable insert or support in or on the nozzle plate, which makes servicing particularly easy.

The cutting blade itself may be made of a hard metal alloy. According to the invention, this may substantially increase the service life of the cutting blade life even further.

The invention is explained in greater detail below by way of example on the basis of the figures, where:

Figure 1:
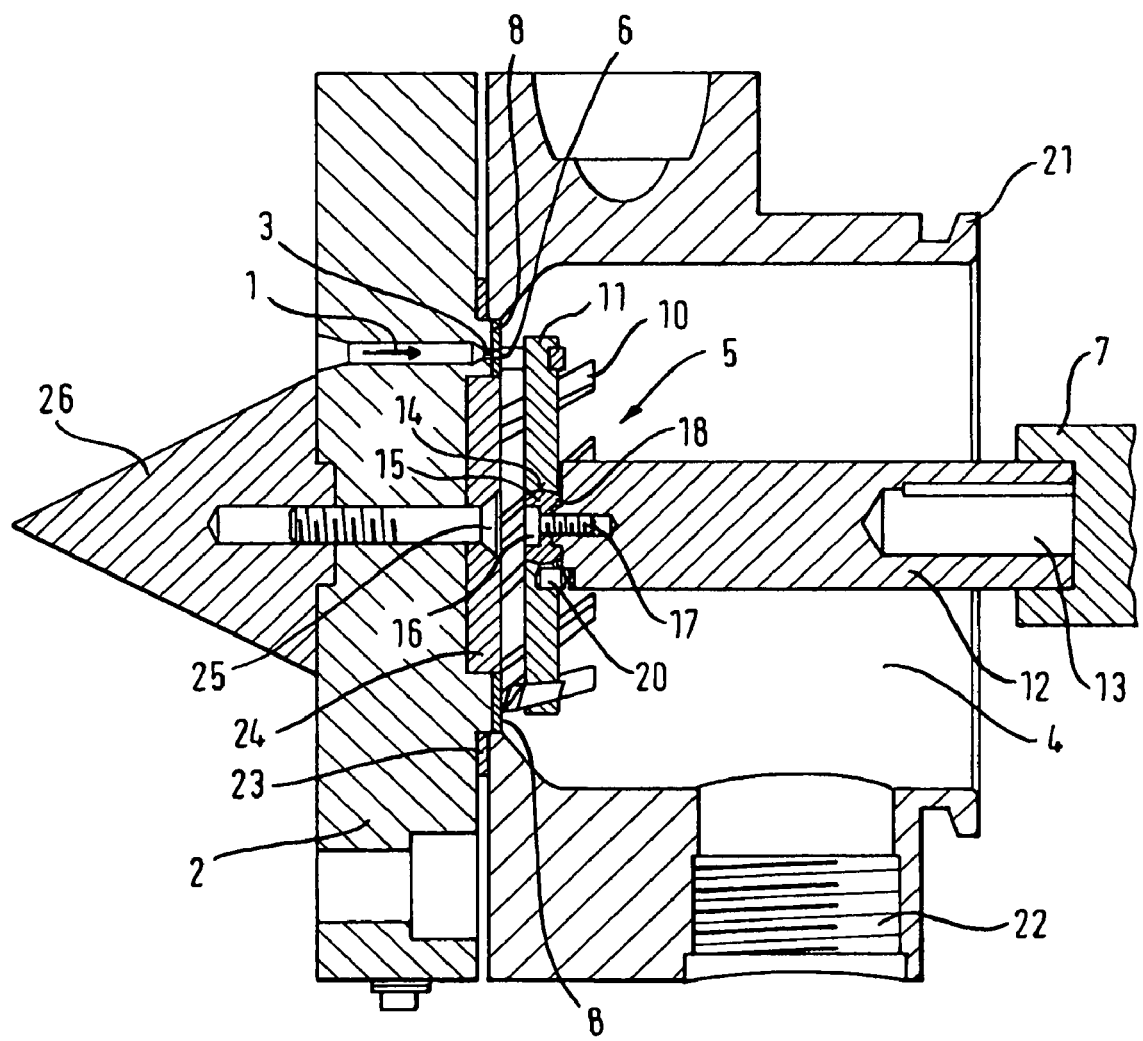
FIG. 1 shows a schematic cross-sectional view of a device for the production of granulate grains from a plastic melt according to one embodiment of the invention.

The device illustrated schematically and not necessarily true to scale in FIG. 1 for the production of granulate grains from a plastic melt 1 (indicated by the arrow in FIG. 1) includes a nozzle plate 2, in front of which a cone 26 is situated in the known manner, this cone belonging to the conduit parts (not illustrate) for the plastic melt, which is supplied in liquid form. Cone 26 is screwed onto nozzle plate 2, for example by a screw which presses plate 24 against nozzle plate 2 by means of the screw head 25. The melt conduits, which end in nozzles or nozzle openings 3, pass through nozzle plate 2. Nozzle openings 3 are introduced into nozzle plate 2 in a multi-ring arrangement and are used to discharge plastic to be granulated from their openings in the known manner.

According to the invention, a diamond coating 8 having openings that coincide with nozzle openings 3 or are aligned therewith are provided at least in the area of the nozzles or nozzle openings 3, knives 10 of a cutting tool 5 passing over these openings by their cutting blades 6, and knives 10 being held by a rotary cutter 11, such that knives 10 cut the plastic discharged from the nozzles into granulate when rotary cutter 11 rotates. Knives 10 remain in physical contact with nozzle plate 2 or with diamond coating 8 of nozzle plate 2 and slide over the latter and past nozzles 3, which ensures a smooth cutting of the plastic discharged from nozzles 3.

Rotary cutter 11 is attached to a drive shaft 12 via the end of the drive shaft facing the rotary cutter. Drive shaft 12 is connected to a drive motor, which is not illustrated here, for which purpose drive shaft 12 of rotary cutter 11 is connected to shaft 13 on the motor side in the known manner. A feed device 7 is used to move cutting tool 5 against nozzle plate 2.

The connection between drive shaft 12 and rotary cutter 11 is designed as follows, a similar design being shown, for example, in German unexamined patent application DE 103 44 793 A1: Rotary cutter 11 has a central recess 14 whose inner surface matches the surface of a sphere. A spherical segment 15 is fitted into this recess 14 in such a way that rotary cutter 11 is adjustable around spherical segment 15 in the manner of a polydirectional tilting motion. Spherical segment 15 has a receptacle for a head 16 of a screw 17, which is screwed into the end of the drive shaft and thereby draws spherical segment 15 against the end of drive shaft 12 an attaches it thereto. Spherical segment 15 has a ring-shaped projection 18 for fixing the spherical segment in a centered manner on drive shaft 12, the projection matching a corresponding projection on the end of drive shaft 12. Due to this means of attaching spherical segment 15 and accommodating rotary cutter 11 via the spherical shape of the outer surface of spherical segment 15 and inner surface 14 of rotary cutter 11, the rotary cutter may be tilted relative to drive shaft 12 in such a way that rotary cutter 11 may be moved from its perpendicular position relative to drive shaft 12 illustrated in FIG. 1 to a position that is tilted by a smaller angle relative to the perpendicular position.

When drive shaft 12 rotates, it carries along rotary cutter 11, knives 10 sliding over the surface of nozzle plate 2 or over diamond coating 8 of nozzle plate 2. If the exact position of drive shaft 12 now shifts relative to nozzle plate 2, for example due to temperature-related displacements, or also for example due to wear on knife 10 or on the relevant surface of nozzle plate 2, feed device 7 ensures that, on the one hand, knives 10 remain in contact with the surface of nozzle plate 2 or diamond coating 8 of nozzle plate 2 as a result of an axial pressure against rotary cutter 11, and the knives thereby compensate a slight tilting of drive shaft 12 relative to nozzle plate 2 in such a way that rotary cutter 11 is able to move on spherical segment 15, such that it adapts to the direction specified by the surface of nozzle plate 2 without the rotary cutter being able to slide out of its centered position relative to drive shaft 12. This ensures that, by maintaining the torque, rotary cutter 11 remains always in a central position relative to drive shaft 12 and may be held in contact with the surface of nozzle plate 2 with the aid of its knives 10.

The area of nozzle plate 2 having diamond coating 8 and having nozzles 3 and rotary cutter 11, including knives 10 thereof, is accommodated in the interior of a processing chamber 4, in which cooling water flows via inlet 22 and an outlet, which is not illustrated, so that the plastic discharged from nozzles 3 is cut under the action of the cooling water, whereby the cut lengths of the plastic discharged from nozzles 3 quickly solidify into granulate grains and are flushed out of the interior of processing chamber 4. Processing chamber 4 is permanently connected to nozzle plate 2 in a manner that is not illustrated here in further detail, a seal 23, which insulates heated nozzle plate 2 against the cooling water-filled interior of processing chamber 4, being inserted between processing chamber 4 and nozzle plate 2.

If desired, although this is not illustrated in FIG. 1, the attachment of knives 10 to rotary cutter 11 may be improved in such a way that, on the one hand, the fasteners holding the knives remain easily accessible and, on the other hand, these fasteners do not hinder the flow in intermediate spaces. For this purpose, the rotary cutter may be designed as shown in German unexamined patent application DE 10 2004 049 862 A1, instead of the illustration in FIG. 1. In this case, supporting surfaces of side walls are formed by radial grooves in a circumferential surface of the rotary cutter and by radial transverse walls in the radial grooves, the radial grooves being limited by the radial transverse walls, and each of the knives is inserted in a hook-like manner into the radial grooves by a projection, one side of the projection forming an abutment for the fastening element, which passes through one radial transverse wall and presses on the abutment. Due to this hook-like attachment of the individual knives and the insertion of the fastening elements through a radial transverse wall, the knives are directly and easily accessible, viewed from one end of the rotary cutter. The knives are therefore situated at a distance from the intermediate spaces between the knives and supports and are therefore unable to obstruct the flow within these intermediate spaces. In addition, the hook-like design of the knives provides a high degree of safety with regard to their position in relation to the rotary cutter, so that, on the whole, the rotary cutter equipped according to the invention has a design that is particularly stable and free of wobbling for operation.

Figure 2:
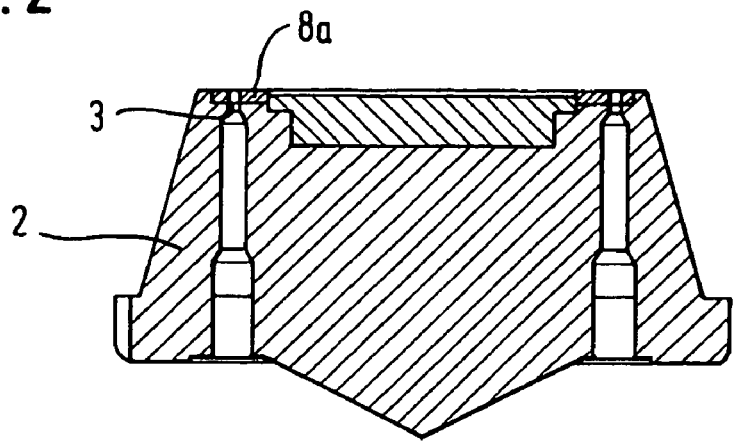
FIG. 2 shows a schematic cross-sectional view of a nozzle plate having a diamond coating provided on a replaceable insert according to a preferred embodiment of the present invention.

FIG. 2 shows a schematic cross-sectional view of a nozzle plate 2 having a diamond coating provided on an replaceable insert 8a according to a preferred embodiment of the present invention. The openings in insert 8a are in alignment with nozzle openings 3 of nozzle plate 2.

Figure 3:
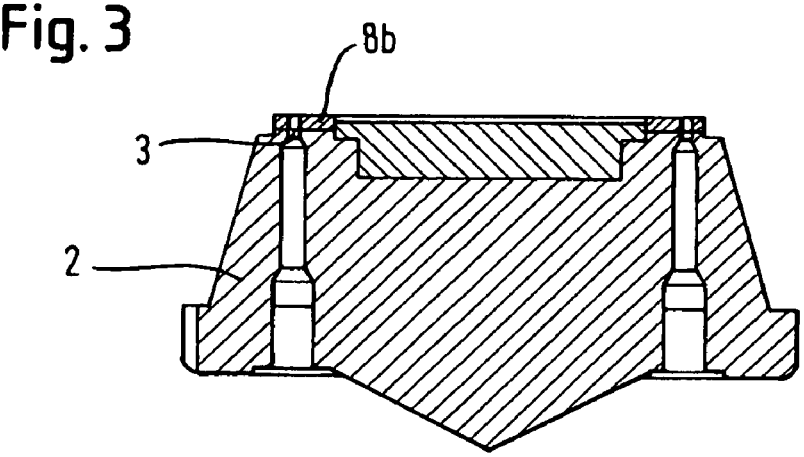
FIG. 3 shows a schematic cross-sectional view of a nozzle plate having a diamond coating provided on a removable support according to a preferred embodiment of the present invention.

FIG. 3 shows a further schematic cross-sectional view of a nozzle plate 2 having a diamond coating provided on a replaceable support 8b according to a further preferred embodiment of the present invention. In this case as well, the openings in support 8b are in alignment with nozzle openings 3 of nozzle plate 2.

Figure 4:
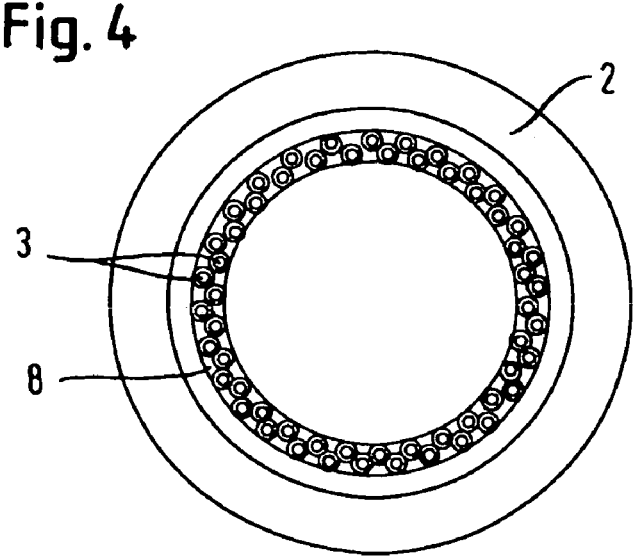
FIG. 4 shows a schematic top view of a nozzle plate having a diamond coating according to a preferred embodiment of the present invention.

FIG. 4 shows a schematic top view of a nozzle plate 2 having a diamond coating 8 according to a preferred embodiment of the present invention, the openings in diamond coating 8 in this case as well being situated in alignment with nozzle openings 3 of nozzle plate 2.

The invention claimed is:

1. A device for the production of granulate grains from a plastic melt comprising (a) a nozzle plate having at least one nozzle opening from which a strand of the plastic melt is discharged into a processing chamber, and (b) a cutting tool having at least one cutting blade configured to move against the nozzle plate by a feed device to fragment the plastic strand discharged from the nozzle opening of the nozzle plate into granulate grains by the cutting blade moving relative to the nozzle opening, wherein the nozzle plate has a diamond coating at least on the surface thereof facing the cutting tool, the hardness of the diamond coating being greater than hardness of the cutting blade, and the average roughness of the diamond coating, being greater than the average roughness of the cutting blade, by at least a factor of two.

2. The device according to claim 1, wherein the average roughness of the diamond coating is greater than the average roughness of the cutting blade at least by a factor of five.

3. The device according to claim 1, wherein the average roughness of the diamond coating is greater than or equal to 0.50 μm.

4. The device according to claim 1, wherein the diamond coating has a thickness in the range of 50 μm to 100 μm.

5. The device according to claim 1, wherein the diamond coating is situated on a replaceable insert or a support in or on the nozzle plate.

6. The device of claim 1, wherein the average roughness of the diamond coating is greater than the average roughness of the cutting blade at least by a factor of ten.

\* \* \* \* \*